United States Patent Office 2,733,640
Patented Feb. 7, 1956

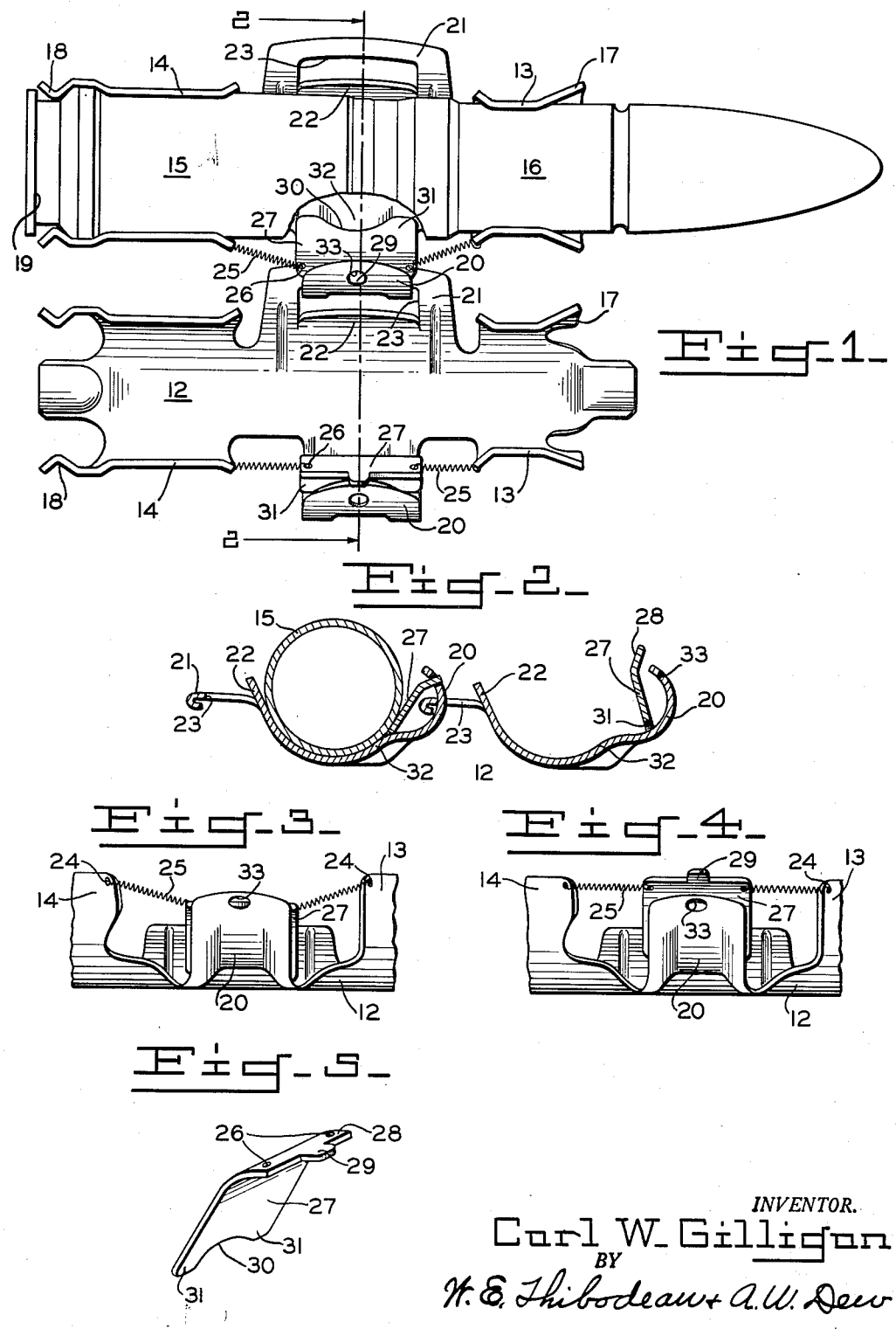
Feb. 7, 1956 — C. W. GILLIGAN — 2,733,640
DISINTEGRATING CARTRIDGE BELT LINK
Filed April 28, 1953
INVENTOR.
Carl W. Gilligan
BY
W. E. Thibodeau + A. W. Dew
ATTORNEYS

2,733,640

DISINTEGRATING CARTRIDGE BELT LINK

Carl W. Gilligan, Swift River, Mass., assignor to the United States of America as represented by the Secretary of the Army Application April 28, 1953, Serial No. 351,763

5 Claims. (Cl. 89—35)

(Granted under Title 35, U. S. Code (1952), sec. 266)

The invention described herein may be manufactured and used by or for the Government for governmental purposes without the payment of any royalty thereon.

This invention relates to cartridge belt links of the push-through type and is more particularly directed to improved means for connecting adjacent links to form an articulated disintegrating ammunition belt.

Since the firing requirements for modern high speed weapons such as machine guns involve the use of large quantities of normally expendable links, it is particularly important that the cost of fabrication thereof be held to the lowest possible level. One important consideration in reducing the expensiveness of link manufacture lies in utilizing a design of extreme simplicity and has been achieved in one instance by providing a unitary link body with oppositely disposed outwardly projecting integral hook and slot portions which permit coupling of adjacent links through the engagement of the hook portion of one link in the slot portion of another. The requisite degree of flexibility between adjacent links is obtained by providing a relatively loose engagement between the respective cooperating hook and slot portions. However, in order to prevent accidental uncoupling of adjacent links during passage of the ammunition belt from its storage area to the feeding mechanism of the gun or even while in the gun itself, the free end on the hook portion of each link extends sufficiently inwardly to cooperate with the case of a cartridge assembled into the link and provide a gap therebetween of lesser width than the corresponding outer border section of the slot portion.

In certain firearms, however, provision has been made for ejecting the fired cartidge case back into the empty link from which the round had been previously extracted for chambering. In such an arrangement, the cooperation between the hook portion of the link and the side of the fired cartridge case therein prevents uncoupling of adjacent links in the same manner as if a live cartridge were present. Inasmuch as certain aircraft installations require that the fired cartridge cases be thrown out of the aircraft itself immediately following their exit from the gun, disintegration of the relinked belt is essential in order to avoid the dangerous situation of a long belt hanging out of the aircraft. Previous attempts at providing the necessary disintegration of adjacent cartridge belt links in which the fired cartridge cases have been relinked have invariably required coupling arrangements substantially inferior to a hook and slot engagement both in simplicity and flexibility.

Accordingly, it is an object of this invention to provide an improved type of disintegrating ammunition belt for use in high speed machine guns wherein the ability of the links to uncouple from one another upon exit from the gun is not prevented by the presence of a relinked cartridge case in each link.

It is another object of this invention to provide a superior disintegrating and relinking cartridge belt link of the type wherein coupling of adjacent links is obtained by the loose engagement of a projecting hook portion on one link with an oppositely projecting slotted flange portion on the other.

Still another object of this invention is to provide a cartridge belt link of the foregoing type having improved means associated with the hook portion of one link for cooperating with the cartridge being held therein to prevent premature uncoupling from an adjacent link prior to extraction of the cartridge from the first-mentioned link.

A further object of this invention resides in the provision of an improved coupling device for the links of ammunition belts employed in high speed machine guns wherein such device positively prevents disintegration between adjacent links during the feeding of cartridges into the gun and yet permits such links to readily disintegrate subsequent to the extraction of the cartridges therefrom even though the fired cartridge cases are returned to each link to be carried out of the gun.

It is a specific object of this invention to provide in a disintegrating cartridge belt link of the relinking type an auxiliary locking member which, while normally preventing uncoupling between adjacent links, is nevertheless automatically rendered inoperative immediately following the extraction of a cartridge from the link thereby permitting fired cartridge cases to be relinked without any effect on the ability of the links to subsequently disintegrate.

The specific nature of the invention as well as other objects and advantages thereof will clearly appear from a description of a preferred embodiment as shown in the accompanying drawings in which:

Fig. 1 is a top view of a coupled pair of cartridge belt links of the present invention showing a cartridge held in one of the links;

Fig. 2 is a cross-sectional view taken on the line 2—2 of Fig. 1;

Fig. 3 is a right side view of the central portion of one of the cartridge belt links without a cartridge therein but with the retainer in the operative position for preventing uncoupling from an adjacent link;

Fig. 4 is a view similar to Fig. 3 but showing the retainer in the inoperative position subsequent to the extraction of the cartridge from the link; and Fig. 5 is an enlarged perspective view of the retainer.

The preferred form of link chosen for the purpose of illustration comprises a generally semi-cylindrical open body portion 12 having forwardly and rearwardly disposed pairs of upstanding resilient ears 13 and 14, respectively, adapted to conjointly grip the sides of a combined cartridge case 15 and projectile 16. The forward end portions of ears 13 are flared outwardly as shown at 17 to insure proper relinking entry of a fired cartridge case 15 into body portion 12. The rear end portions of ears 14 are provided with opposite inwardly directed detents 18 adapted to resiliently engage in the extractor groove 19 of cartridge case 15 and hold the cartridge against accidental longitudinal movement. On one side of body portion 12 there is provided an outwardly and upwardly curved hook portion 20 substantially midway between cartridge gripping ears 13 and 14. On the opposite side of body portion 12 is formed an outwardly projecting integral flange portion 21 also disposed substantially midway between ears 13 and 14. A substantially rectangular section 22 is cut from flange 21 and is bent upwardly about the uncut inner edge thereof to expose a slot 23 therein. When the links and cartridges are assembled to form an ammunition belt, hook portion 20 of one link extends upwardly through slot 23 of the adjacent link and is free to move both laterally and longitudinally within the confines thereof. As a result, the connection between adjacent links permits substantial twisting and turning between adjacent links.

Suitable holes 24 are drilled in the inner top corners of those ears 13 and 14 which straddle hook portion 20. Holes 24 are engaged by the ends of coil springs 25 whose opposite ends in turn engage similar holes 26 provided in the upper corners of an independent retainer 27. Thus, retainer 27 is flexibly mounted for movement in all directions as well as for twisting movement about the longitudinal axis of springs 25. Retainer 27 is a substantially rectangular plate having a bent-over top portion 28 on the upper edge of which is provided a substantially centrally located projecting lug 29. The bottom edge of retainer 27 is arcuately formed as shown at 30 to provide a pair of oppositely disposed legs 31 arranged to straddle a raised strengthening rib 32 formed in body portion 12 and extending substantially along hook portion 20. A hole 33 is provided in hook portion 20 adjacent the free end thereof and is arranged to engage lug 29 of retainer 27 when such member is disposed in the operative position.

To assemble the links into belt form, hook portion 20 of one is inserted through slot 23 of the adjacent link. Retainer 27 is then rotated about its vertical axis and simultaneously depressed outwardly and downwardly so that lug 29 thereon enters into hole 33 of hook portion 20. In such position, legs 31 of retainer 27 are in contact with body portion 12 and straddle rib 32. As a result, retainer 27 cooperates with body portion 12 and hook portion 20 to form an enclosed area which prevents disengagement of hook portion 20 from slot 23 of the adjacent link. However, due to the bias imparted to coil springs 25 as lug 29 is moved into engagement with hole 33 in hook portion 20, a retainer 27 would automatically return to the normal vertical position were it not for the fact that the cartridge is assembled into the link while retainer 27 is held in engagement with hook portion 20. The cylindrical cartridge case 15 bears against the back of retainer 27 and holds it in place.

However, when the cartridge is rammed forwardly out of the link, the restraining force on retainer 27 is removed and the bias previously imparted to springs 25 during movement of retainer 27 to the operative position serves to automatically return it to the non-operative position. Inasmuch as the normal position of retainer 27 aligns the back thereof with cartridge gripping ears 13 and 14, there is no impediment to the relinking movement of the fired cartridge case 15. Even if retainer 27 were not properly aligned with ears 13 and 14 due to the shocks and vibration encountered during feeding of the empty link into the position necessary for relinking of the fired cartridge case 15, the rear end thereof would force the flexibly suspended retainer 27 out of the way. In any event, retainer 27 no longer acts to prevent disengagement of hook portion 20 from slot 23 of the adjacent link. Thus, as the re-linked cases are moved out of the firearm, they are free to uncouple from one another especially when they are permitted to fall to any great extent as is the case in certain aircraft installations.

If circumstances are such as to permit ejection of relatively short lengths of the linked belt, it may not be necessary to employ the disintegrating device of the present invention in each and every link. In such case, conventional non-disintegrating links may be belted in the desired number and a disintegrating link employing the present invention inserted at the proper location to insure uncoupling of adjacent links at the desired length of belt.

Although a particular embodiment of the invention has been described in detail herein, it is evident that many variations may be devised within the spirit and scope thereof and the following claims are intended to include such variations.

I claim:

1. A cartridge holding link of the push-through type adapted to cooperate with other similar links to form a disintegrating cartridge belt, each of said links having a hook portion projecting laterally from one side thereof, a similarly projecting slotted flange portion on the opposite side of said link for loosely-engaging said hook portion of an adjacent link, a retainer engageable with said hook portion to block uncoupling between said hook and flange portions of adjacent links, said retainer cooperating with the cartridge in said link to maintain engagement between said retainer and said hook portion, and spring means operative on said retainer for ensuring disengagement thereof from said hook portion immediately following the removal of the cartridge from said link.

2. A cartridge holding link of the push-through type adapted to cooperate with other similar links to form a disintegrating cartridge belt, each of said links having an open body portion, a hook portion projecting laterally from one side of said body portion, a similarly projecting slotted flange portion extending from the opposite side of said body portion for loosely engaging said hook portion of an adjacent link, a retainer engageable with said hook portion for blocking the gap between the top and bottom thereof to prevent uncoupling of said flange portion from said hook portion, said retainer being disposed relative to the cartridge in said body portion whereby the cartridge maintains the engagement between said retainer and said hook portion, and spring means attached to said retainer and to said body portion of said link in position to be tensioned during movement of said retainer into the hook-engaging position whereby said spring means operates to automatically free said retainer from said hook portion immediately upon removal of the cartridge from said body portion of said link.

3. A cartridge holding link of the push-through type adapted to cooperate with other similar links to form a disintegrating cartridge belt, each of said links having an opposed pair of resilient cartridge gripping portions adjacent the front and rear ends thereof, a hook portion projecting laterally from one side of said link between said front and rear cartridge gripping portions, a similarly projecting flange portion extending from the opposite side of said link, said flange portion having a slot therein engageable with said hook portion of an adjacent link to loosely couple said links, a retainer for blocking the gap between the top and bottom of said hook portion to prevent uncoupling between adjacent links, means on said retainer engageable with said hook portion, said retainer adapted to be held in a hook-engaging position by the adjacent peripheral surface of the cartridge held in said link, and spring means attached to either side of said retainer and to said front and rear cartridge gripping portions for flexibly suspending said retainer therebetween inwardly of said hook portion and in a higher elevational plane relative thereto whereby movement of said retainer to said hook-engaging position incurs the necessary bias in said spring means to automatically return said retainer to a non-blocking position relative to said hook portion immediately following removal of the cartridge from said link.

4. A disintegrating cartridge belt composed of a multiplicity of cartridge holding links of the push-through type, each of said links comprising an open body portion having a front and rear pair of opposed resilient cartridge gripping portions, an upwardly and inwardly curved hook portion projecting laterally from said body portion midway between said front and rear cartridge gripping portions, a similarly projecting flange portion on the opposite side of said body portion, said flange portion having a slot therein for loosely receiving said hook portion of an adjacent link to thereby couple said links, a substantially rectangular centrally curved retainer having a lug projecting upwardly therefrom, said hook portion having a hole in the upper end thereof for receiving said lug when said retainer is positioned to block the gap between the top and bottom of said hook portion, and spring means attached to the upper corners of said retainer and to the opposed corners of said front and rear cartridge gripping portions on said body portion whereby said retainer is flexibly suspended adjacent said hook portion and in a higher elevational plane relative thereto, said retainer being constructed and arranged to be held in engagement with said hook portion by the exterior surface of the cartridge in said body portion whereby disengagement between said hook and flange portions is prevented only prior to removal of the cartridge from said body portion of said link.

5. A disintegrating cartridge belt composed of a multiplicity of cartridge holding links of the push-through type adapted for the relinking of fired cartridge cases, each of said links having a hook portion projecting laterally from one side thereof, a similarly projecting slotted flange portion on the opposite side of said link for loosely engaging said hook portion of an adjacent link, a retainer having means engageable with said hook portion to prevent uncoupling between said hook and flange portions of adjacent links, said retainer cooperating with the cartridge in said link to prevent disengagement of said retainer from said hook portion, and spring means flexibly suspending said retainer inwardly of said hook portion with said hook portion engaging means thereon in a higher elevational plane than the top of said hook portion, said spring means operative on said retainer to insure disengagement thereof with said hook portion immediately following removal of the cartridge from said link and to subsequently hold said retainer out of engagement with said hook portion and out of the path of the relinking movement of a fired cartridge case.

References Cited in the file of this patent

FOREIGN PATENTS

| | | |
|---|---|---|
| 719,222 | Germany | Apr. 1, 1942 |
| 123,848 | Sweden | Jan. 18, 1949 |